US006822973B2

United States Patent
Kelley et al.

(10) Patent No.: US 6,822,973 B2
(45) Date of Patent: Nov. 23, 2004

(54) APPARATUS AND METHOD FOR IMPLEMENTING A REDUCED SLOTTED MODE IN A COMMUNICATION SYSTEM

(75) Inventors: Sean S. Kelley, Hoffman Estates, IL (US); Valentin Oprescu-Surcobe, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/775,268

(22) Filed: Feb. 10, 2004

(65) Prior Publication Data

US 2004/0160942 A1 Aug. 19, 2004

Related U.S. Application Data

(60) Provisional application No. 60/448,343, filed on Feb. 18, 2003.

(51) Int. Cl.[7] .................................................. H04J 3/06
(52) U.S. Cl. ....................... 370/503; 370/311; 370/350; 455/515
(58) Field of Search ................................. 370/310, 350, 370/503, 311; 455/434, 515

(56) References Cited

U.S. PATENT DOCUMENTS

| 6,289,227 | B1 | * | 9/2001 | Shi | 455/574 |
| 6,330,234 | B1 | * | 12/2001 | Tomasi et al. | 370/342 |
| 6,477,608 | B1 | * | 6/2003 | Moon et al. | 370/311 |
| 6,735,454 | B1 | * | 5/2004 | Yu et al. | 455/574 |
| 6,738,617 | B2 | * | 5/2004 | Rosen et al. | 455/418 |
| 2003/0114156 | A1 | * | 6/2003 | Kinnavy | 455/434 |

* cited by examiner

*Primary Examiner*—Steven Nguyen
*Assistant Examiner*—Thien Tran
(74) *Attorney, Agent, or Firm*—Lalita W. Pace

(57) ABSTRACT

The present invention provides an apparatus and method for operating in reduced slotted mode. Following the release of the traffic channel, a mobile station (102) and base station (108) operate with a shorter slot cycle governed by a reduced slot cycle index value. The mobile station and base station operate using the reduced slot cycle index value until a particular time occurs governed by a reduced slotted timer value or for a period of time governed by the reduced slotted timer value. The invention provides faster call setup for mobile station terminated calls, without requiring registration with a MSC (110) to change between the reduced slot cycle index value and the registered slot cycle index value.

26 Claims, 5 Drawing Sheets

APPARATUS AND METHOD FOR IMPLEMENTING A REDUCED SLOTTED MODE IN A COMMUNICATION SYSTEM

REFERENCE(S) TO RELATED APPLICATION(S)

The present application claims priority from provisional application, Ser. No. 60/448343, entitled "APPARATUS AND METHOD FOR IMPLEMENTING A REDUCED SLOTTED MODE IN A COMMUNICATION SYSTEM," filed Feb. 18, 2003, which is commonly owned and incorporated herein by reference in its entirety.

FIELD OF THE INVENTION

The present invention relates generally to the field of communication systems, and more particularly, to an apparatus and method for implementing a reduced slotted mode in a communication system.

BACKGROUND OF THE INVENTION

Call setup for a mobile station terminated call can take several seconds or more to complete. Although this length of time may be acceptable for voice calls, it has a significant negative impact on the user's perception of call quality for data calls. Therefore, in typical deployments, the traffic channel is maintained during a period of data inactivity before the data call is released to the dormant state. Such prolonged maintenance of the data call during periods of data inactivity results in inefficient use of RF and channel element resources. The desirable reduction or elimination of hold over time, while preserving acceptable service for the end user, requires fast call setup time.

One of the most significant components of call setup for mobile station terminated calls is the paging delay. While in the Idle State, the mobile station typically operates in the Slotted Mode in order to conserve battery life. In the Slotted Mode, the mobile station monitors the forward common control channel for pages only during certain assigned time slots. The Slot Cycle Index (SCI) governs how often the mobile station checks for a page. The lowest currently standardized SCI value (i.e. 0) corresponds to 1.28 seconds. Thus, a page for a mobile station using the shortest slot cycle in the Slotted Mode can be delayed up to 1.28 seconds, even when the lowest SCI value is used.

As previously described, the cdma2000 standard currently supports the concept of Slotted Mode. Slotted Mode is described in the TIA/EIA IS-2000.5 standard, section 2.6.2.1.1.3. However, Slotted Mode as currently defined has a significant impact to call setup delay because the shortest slot cycle is 1.28 seconds. The cdma2000 standard also currently supports a Slotted Timer feature. In accordance with this feature, the mobile station operates in Non-Slotted Mode, i.e., continuously monitors the forward common control channel, following its release from the traffic channel for a duration of time specified by the Slotted Timer (provided by the base station). A significant drawback to this feature is that continuously monitoring the forward common control channel has a significant impact on the battery life of the mobile station. Also, the feature is controlled entirely by the base station. The mobile station is unable to request being put in Non-Slotted Mode.

One proposed solution that has been introduced for standards body consideration is to allow reduced SCI values. If accepted, the proposal would reduce the shortest slot cycle down to 80 ms. However, under the solution, the only way for a mobile station to change its SCI is via mobile registration. Therefore, in order to effectively make use of the reduced SCI without wasting mobile station battery life, the mobile station must register each time it changes between a reduced SCI value (i.e. while a packet data session is dormant) and a higher SCI value (i.e. while there is no dormant packet data session). This results in increased loading on the air and IOS interfaces.

Thus, a need exists for an apparatus and method for implementing a reduced slotted mode, with minimal impact on the air and IOS interfaces.

DETAILED DESCRIPTION OF THE DRAWINGS

Figure 1:
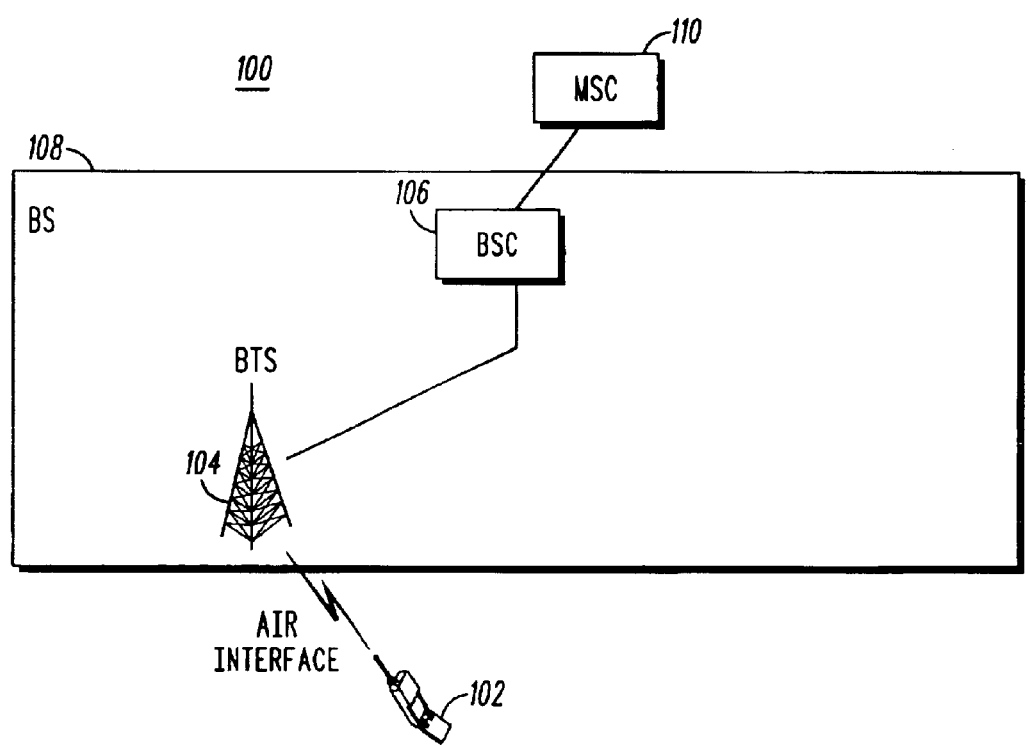
FIG. 1 is a block diagram of a system that can be used to implement the apparatus and method of the present invention.

The present invention provides an apparatus and method for implementing a reduced slotted mode in a communication system. In a first embodiment, a method of implementing a reduced slotted mode in a mobile station includes transmitting a request for reduced slotted mode, wherein the request comprises a desired reduced slotted timer value and a desired reduced slot cycle index value; determining whether the request is granted; and when the request is granted, operating in reduced slotted mode until a time corresponding to the reduced slotted timer value occurs (in the case of an absolute time, e.g., 2:30 pm on a given date) or until a period of time corresponding to the reduced slotted timer value elapses (such as 30 minutes), wherein a frequency at which the mobile station checks for a page is governed by the reduced slot cycle index value.

In a second embodiment of the present invention, a method of implementing a reduced slotted mode in a mobile station includes receiving a first message from a base station, the first message indicating whether the base station supports reduced slotted mode; when the base station supports reduced slotted mode, determining whether the first message specifies a maximum reduced slotted timer value; when the first message does not specify a maximum reduced slotted timer value, sending a second message to the base station requesting reduced slotted mode, wherein the second message specifies a reduced slotted timer value and a desired reduced slot cycle index value; when the first message specifies a maximum reduced slotted timer value, sending a second message to the base station requesting reduced slotted mode, wherein the second message specifies a reduced slot cycle index and a reduced slotted timer value that is earlier in time (in the case of an absolute time) than the maximum reduced slotted timer value specified in the first message, less than the maximum reduced slotted timer value specified in the first message (in the case of a time period), or equal to the maximum reduced slotted timer value specified in the first message; and operating in reduced slotted mode until a time corresponding to the reduced slotted timer value occurs or until a period of time corresponding to the reduced slotted timer value elapses, wherein a frequency at which the mobile station checks for a page is governed by the reduced slot cycle index value.

In a third embodiment of the present invention, a method of implementing a reduced slotted mode in a base station includes sending a message to a mobile station, the message indicating whether the base station supports reduced slotted mode; receiving a request for reduced slotted mode, the request comprising a desired reduced slot cycle index value and a desired reduced slotted timer value; and operating in reduced slotted mode until a time corresponding to the reduced slotted timer value occurs or until a period of time corresponding to the reduced slotted timer value elapses, wherein a slot in which the base station pages the mobile station is governed by the reduced slot cycle index value.

In a fourth embodiment of the present invention a method of implementing a reduced slotted mode in a base station includes receiving a request for reduced slotted mode, the request comprising a desired reduced slot cycle index value and a desired reduced slotted timer value; determining whether the desired reduced slotted timer value is earlier in time than a maximum reduced slotted timer value or less than a maximum reduced slotted timer value; when the desired value is earlier in time than the maximum or less than the maximum, setting a reduced slotted timer value equal to the desired reduced slotted timer value; and operating in reduced slotted mode until a time corresponding to a reduced slotted timer value occurs or until a period of time corresponding to the reduced slotted timer value elapses, wherein a slot in which the base station pages the mobile station is governed by the reduced slot cycle index value.

In a fifth embodiment of the invention, a storage medium having stored thereon a set of instructions which, when loaded into a processor of a mobile station, causes the mobile station to transmit a request for reduced slotted mode, wherein the request comprises a desired reduced slotted timer value and a desired reduced slot cycle index value; determine whether the request is granted; and when the request is granted, operate in reduced slotted mode until a time corresponding to the reduced slotted timer value occurs or until a period of time corresponding to the reduced slotted timer value elapses, wherein a frequency at which the mobile station checks for a page is governed by the reduced slot cycle index value.

Referring now to FIG. 1, a functional block diagram of a system that can be used with the present invention is shown. It is assumed that the reader is familiar with cellular telephone systems and the manner in which messages are transmitted between a Base Transceiver Station (BTS) serving a particular service cell and a mobile station (MS) located within that cell. To simplify the present description, only the portion of a cellular telephone system relevant to the present invention is discussed. FIG. 1 shows, a MS 102 in communication with a BTS 104 over an air interface. The MS 102 may be but is not limited to a radiotelephone, internet appliance, laptop computer, or other suitable communication device. The BTS 104 is coupled to a Base Station Controller (BSC) 106. The BTS 104 and BSC 106 are collectively referred to herein as the Base Station (BS) 108. The BS 108 is coupled to a Mobile Switching Center (MSC) 110 over an IOS interface (as specified in 3GPP2 A.S0001-A, "3GPP2 Access Network Interfaces Interoperability Specification", and subsequent versions). Any commercially available MS 102 can be used with the present invention. A BS 108 commercially available from Motorola, Inc., Schaumburg, Ill. and a MSC 110 commercially available from Nortel Networks, Inc., can be used with the present invention.

As commonly known in the art, the Paging Channel or the Forward Common Control Channel protocol provides for scheduling the transmission of messages for a specific MS in certain assigned slots. A MS that monitors the Paging Channel or the Forward Common Control Channel only during certain assigned slots, typically one or two slots per slot cycle, is referred to as operating in the Slotted Mode. During the slots in which the Paging Channel or the Forward Common Control Channel is not being monitored, the MS can stop or reduce processing for power conservation. A MS may not operate in the slotted mode in any state except the Mobile Station Idle State.

Currently, when the MSC 110 has data to transmit to the MS 102, it instructs the BS 108 to page the MS 102 using the SCI that the MS 102 provided during registration. The MS 102 also uses the SCI to determine how often to check for a page from the BS 108. The present invention provides an apparatus and method for operating in reduced slotted mode, wherein the MS 102 can change the SCI without registering the new SCI with the MSC 110. While implementing reduced slotted mode, the BS 108 overrides the SCI communicated by the MSC 110 and uses an SCI requested by the MS 102. The MS 102 also requests to operate in reduced slotted mode for a period of time. The MS 102 selects the reduced SCI and the period of time for operating in reduced slotted mode based on its knowledge of the application, the MS's capabilities, battery status and possibly information from the BS 108.

In first and second embodiments of the invention, methods of implementing reduced slotted mode in the MS 102 are described. In the first embodiment, MS initiated reduced slotted mode is described. In the second embodiment, BS initiated reduced slotted mode is described. Turning now to the first embodiment, the MS 102 initiates reduced slotted mode by sending a request to the BS 108. The request includes a desired reduced SCI and a desired reduced Slotted timer value corresponding to a time period spent operating in reduced slotted mode. The timer value may define a period of time (e.g., 30 seconds) or may define an absolute time limit (3:30 pm on February 3). The MS 102 waits for the BS 108 to acknowledge whether it supports reduced slotted mode. If the BS 108 response is that it supports reduced slotted mode or if the MS 102 does not receive a response, the MS 102 sets the reduced Slotted timer according to the desired reduced Slotted timer value and begins operating in reduced slotted mode using its desired reduced SCI. As described in more detail below, the MS 102 may use a different reduced slotted timer value if the BS 108 so dictates.

The MS 102 operates in reduced slotted mode until the timer expires and then reverts back to Normal operation. The MS 102 also reverts back to Normal operation when the MS 102 acquires the traffic channel as a result of an origination or termination while the timer is running. Normal operation in the Idle State typically means Normal Slotted Mode operation, while Normal operation in the Traffic State typically means traffic channel processing.

BS initiated reduced slotted mode in the MS 102 will now be described. After a predetermined period of inactivity over the traffic channel occurs during a packet data session, the MS 102 receives a message from the BS 108 releasing the MS 102 from the traffic channel. The MS determines from the message whether the BS 108 supports reduced slotted mode, and if so, whether the BS 108 specified a maximum reduced slotted timer value. When a maximum reduced slotted timer value is specified, the MS 102 requests reduced slotted mode specifying a reduced SCI and a reduced slotted timer value that is no greater than the maximum value specified by the BS 108. This informs the BS 108 that the MS 102 desires to operate in reduced slotted mode using the reduced SCI for a period of time corresponding to the reduced slotted timer value. The MS 102 then releases the traffic channel and operates in reduced slotted mode until an event occurs to cause the MS 102 to revert back to Normal operation.

In third and fourth embodiments of the invention, methods of implementing reduced slotted mode in the BS 108 are described. In the third embodiment, BS initiated reduced slotted mode is described. In the fourth embodiment, MS initiated reduced slotted mode is described. Turning now to the third embodiment, the BS 108 initiates reduced slotted mode by sending a message to the MS 102 releasing the MS 102 from the traffic channel and indicating that the BS 108 supports reduced slotted mode. Optionally, the message may specify a maximum time period during which the BS 108 will support reduced slotted mode (maximum reduced slotted timer value). When the BS 108 receives a reduced slotted mode request from the MS 102, the request including a desired reduced SCI and a desired reduced slotted timer value, the BS 108 enables a reduced slotted timer using a timer value that does not exceed a maximum value as determined by the BS 108, and begins operating in reduced slotted mode using the desired reduced SCI to page the MS 102 when a page request is received. When the timer expires or when any other event occurs to cease reduced slotted mode operation, such as acquiring MS 102 on the traffic channel, the BS 108 reverts back to Normal operation. Normal operation with the MS 102 in the Idle State typically means Normal Slotted Mode operation using the registered SCI to page the MS 102 when a page request arrives, while Normal operation with the MS 102 in the Traffic State typically means traffic channel processing.

MS initiated reduced slotted mode operation in the BS 108 will now be described. The BS 108 receives a reduced slotted mode request from the MS 102, the request including a desired reduced SCI and a desired reduced slotted timer value. The BS 108 determines whether the requested reduced slotted timer value exceeds a maximum value. When the requested value exceeds the maximum, the BS 108 specifies the maximum reduced slotted timer value in a message to the MS 102 confirming support of reduced slotted mode. The BS 108 then begins slotted mode operation using the reduced SCI specified by the MS 102 for a period of time corresponding to the maximum reduced slotted timer value. When the requested value does not exceed the maximum, the BS 108 confirms that it supports reduced slotted mode and begins slotted mode operation using the reduced SCI specified by the MS 102 for a period of time corresponding to the reduced slotted timer value requested by the MS 102. When the time period expires or when any other event occurs to cease reduced slotted mode operation, the BS 108 reverts back to Normal operation.

Regarding the operation of the reduced slotted mode feature in conjunction with the existing cdma2000 Slotted Timer feature described earlier, the Slotted Timer (specified by the BS) and the Reduced Slotted Timer (specified by the MS) can run concurrently, with the Non-Slotted Mode feature taking precedence over the reduced slotted mode feature while both timers are enabled.

Figure 2:
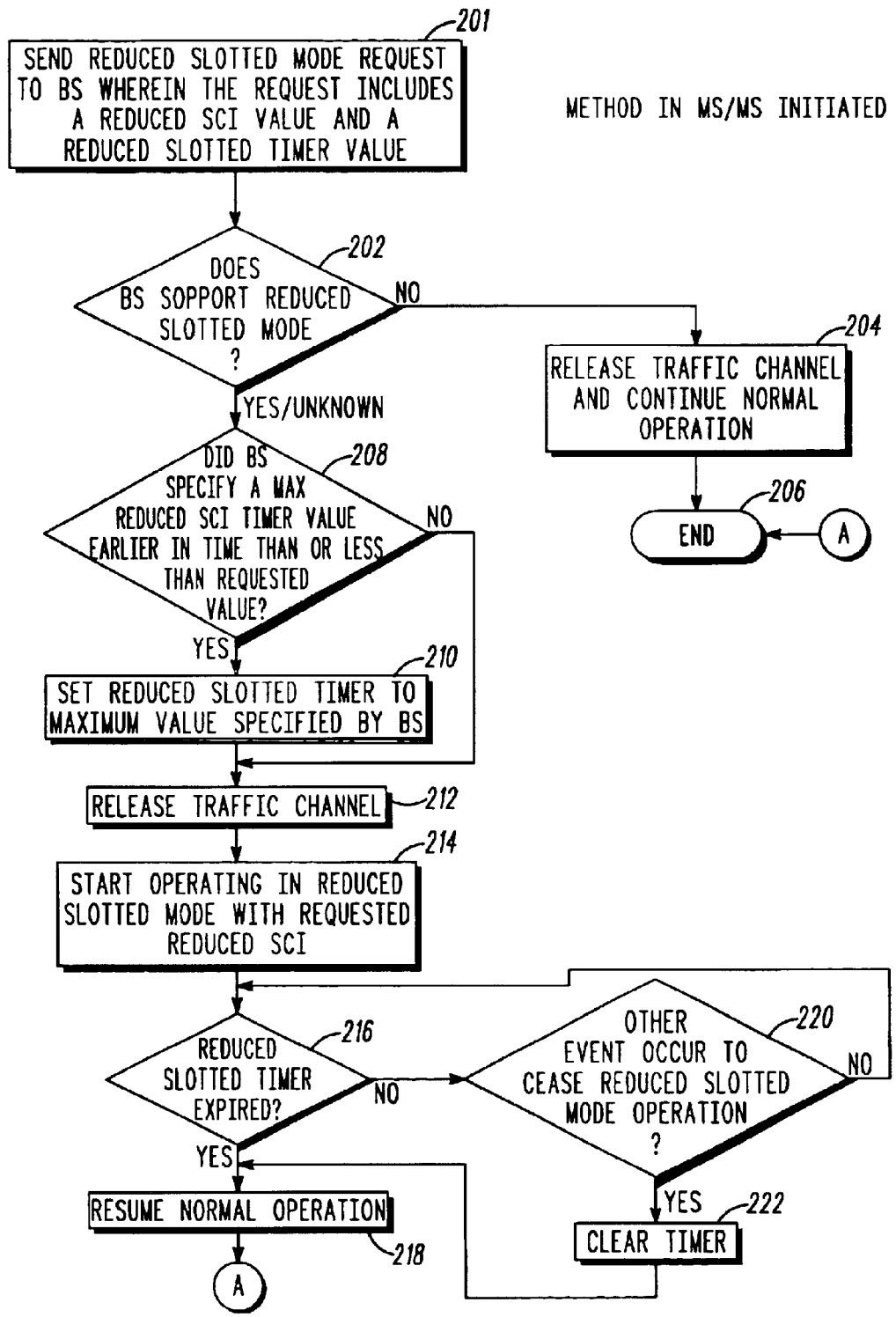
FIG. 2 is a flow chart of a first embodiment of the method in accordance with the present invention.

The embodiments of the method of the present invention will now be described in detail with reference to the flow charts of FIGS. 2–5. FIG. 2 is a flow diagram of the first embodiment of the method of the present invention. In accordance with the first embodiment, the MS 102 initiates the request for reduced slotted mode. The method runs in the MS 102 on a microprocessor or general purpose computer commonly known in the art. At step 201, the MS 102 sends a reduced slotted mode request to the BS 108. The request includes a reduced SCI value and a reduced slotted timer value. At step 202, the MS 102 determines whether the BS 108 supports reduced slotted mode. If the MS 102 receives a message from the BS 108 indicating that the BS 108 does not support reduced slotted mode, the MS 102 releases the traffic channel and continues Normal operation (step 204). Next, the method ends at step 206. If at step 202 the MS 102 receives a message from the BS 108 indicating that the BS 108 supports reduced slotted mode ("yes") or the MS 102 does not receive a response from the BS 108 ("unknown"), the MS 102 determines whether the BS 108 specified a maximum reduced slotted timer value that is less than the requested reduced slotted timer value (step 208). If the BS specified a maximum value less than the requested value, the MS 102 sets the reduced slotted timer value to the maximum value specified by the BS 108 (step 210). Next, the MS releases the traffic channel (step 212) and begins operating in reduced slotted mode with the requested reduced SCI (step 214). Referring back to step 208, if the BS did not specify a maximum reduced slotted timer value less than the requested value, the method skips step 210 and proceeds to step 212 (as previously described).

There are several events that can occur to cause the MS 102 to cease operating in reduced slotted mode. At step 216, the MS 102 monitors whether the reduced slotted timer has expired. If the answer is yes, the MS 102 resumes Normal operation and the method ends (step 206). If the answer is no, the method determines whether an event (other than the timer expiring) has occurred to cause the MS 102 to cease reduced slotted mode operation (step 220). Such events can be, for example, the MS 102 being put on the traffic channel.

In such a case, the MS 102 clears the reduced slotted timer (step 222), resumes Normal operation (step 218), and the method ends at step 206. If another event has not occurred to cause the MS 102 to cease reduced slotted mode operation, the method continues looping through steps 216 and 220 until the timer expires or another event occurs to end reduced slotted mode operation. The embodiment of FIG. 2 illustrates one order in which the steps may be performed. A person of ordinary skill in the art will recognize that these steps, for example steps 216 and 220 may be performed in a different order or concurrently depending on the particular design or implementation chosen.

Figure 3:
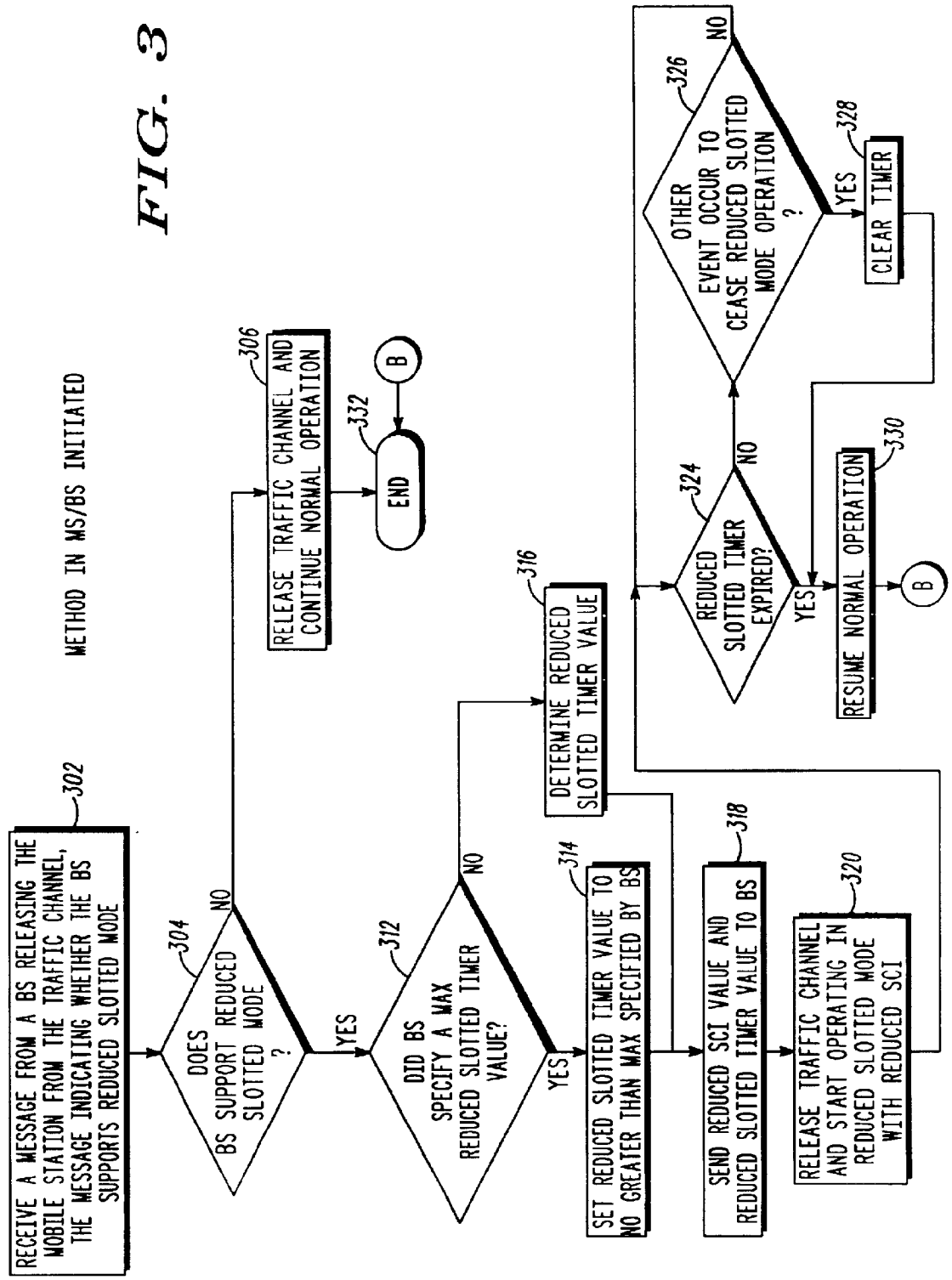
FIG. 3 is a flow chart of a second embodiment of the method in accordance with the present invention.

FIG. 3 is a flow diagram of the second embodiment of the method of the present invention. After detecting a predetermined period of inactivity on the traffic channel, the BS 108 releases the MS 102 from the traffic channel. The BS 108 includes in the release an indication of whether it supports reduced slotted mode. The method begins at step 302 when the MS 102 receives a message from the BS 108 releasing the MS 102 from the traffic channel. The message includes an indication of whether the BS 108 supports reduced slotted mode. At step 304, the MS 102 determines whether the BS 108 supports reduced slotted mode. If the answer is no, the MS 102 releases the traffic channel and continues normal operation (step 306). At step 332, the method ends.

Referring back to step 304, if the MS 102 determines that the BS 108 supports reduced slotted mode, the MS 102 determines whether the BS specified a maximum reduced slotted timer value (step 312). If the answer is yes, the MS 102 sets the desired reduced slotted timer value to a value no greater than the maximum value specified by the BS 108 (step 314). If the answer is no, the MS (102) determines the desired reduced slotted timer value (step 316). Next, the MS 102 sends a reduced slotted mode request to the BS 108 and includes a desired SCI value and desired reduced slotted timer value (step 318). At step 320, the MS 102 releases the traffic channel and starts operating in reduced slotted mode with the reduced SCI. At step 324, the MS 102 monitors whether the reduced slotted timer has expired. If the answer is yes, the MS 102 resumes Normal operation and the method ends (step 332). If the answer is no, the method determines whether a different event has occurred to cause the MS 102 to cease reduced slotted mode (step 326). In such a case, the MS 102 clears the reduced slotted timer (step 328), resumes Normal operation (step 330), and the method ends at step 332. If another event has not occurred to cause the MS 102 to cease slotted mode operation, the method continues looping through steps 324 and 326 until the timer expires or another event occurs to end reduced slotted mode operation. The embodiment of FIG. 3 illustrates one order in which the steps may be performed. A person of ordinary skill in the art will recognize that these steps, for example steps 324 and 326 may be performed in a different order or concurrently depending on the particular design or implementation chosen.

Figure 4:
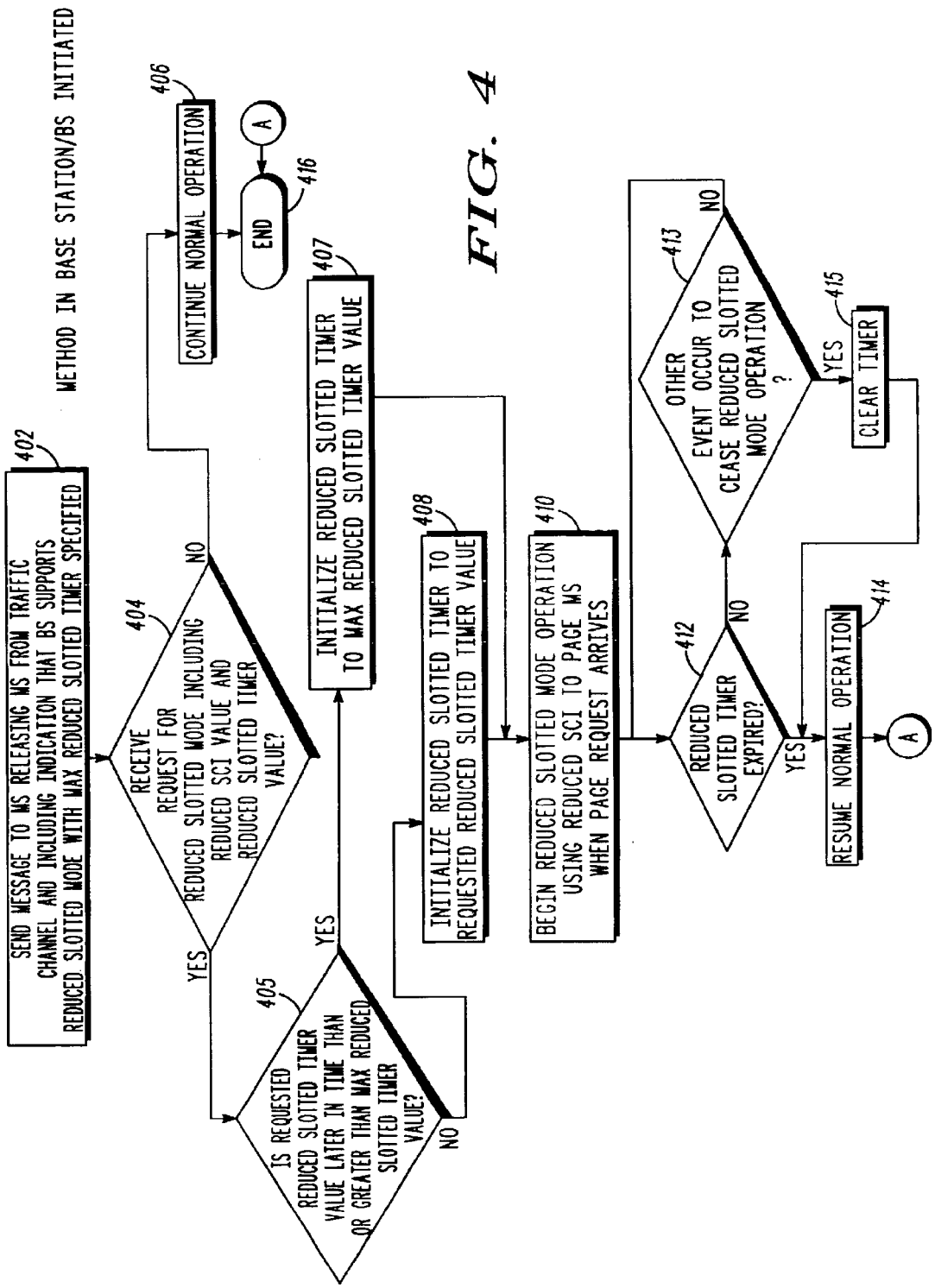
FIG. 4 is a flow chart of a third embodiment of the method in accordance with the present invention.
Figure 5:
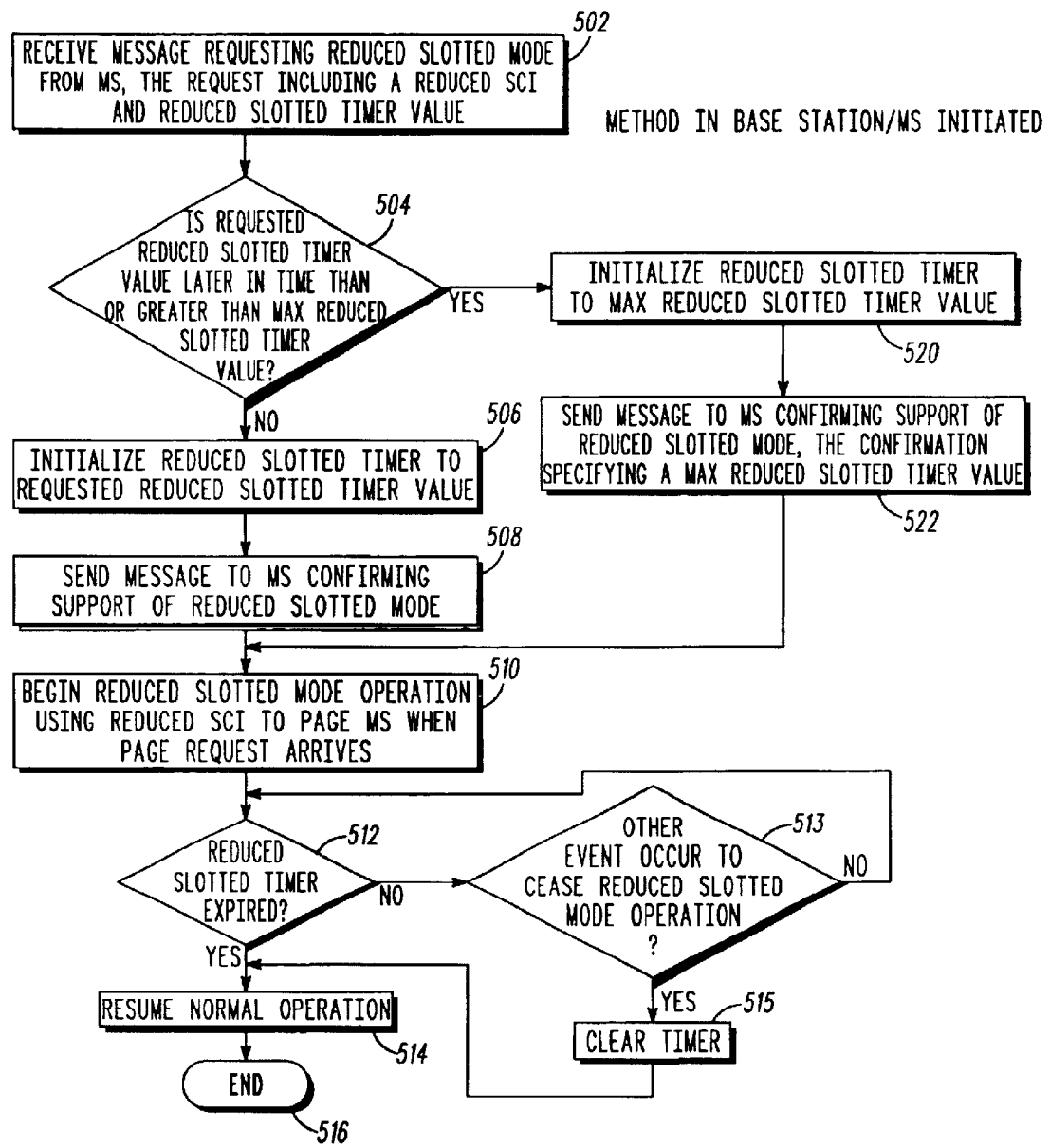
FIG. 5 is a flow chart of a fourth embodiment of the method in accordance with the present invention.

FIGS. 4 and 5 illustrate embodiments of the method of the present invention from the BS 108 perspective. The method can run in any element of the BS 108 on any microprocessor or general purpose computer commonly known in the art. Referring to FIG. 4, a third embodiment of the method of the present invention is shown. In this embodiment, the BS 108 initiates communication with the MS 102. In particular, at step 402, the BS 108 sends a message to the MS 102 releasing the MS from the traffic channel. The message includes an indication that the BS 108 supports reduced slotted mode and specifies a maximum reduced slotted timer value. At step 404, the BS 108 determines whether reduced slotted mode has been requested, where the request includes a reduced SCI value and reduced slotted timer value. If the answer is no, the BS 108 continues Normal operation (step 406). At step 416, the method ends. If the answer is yes, the BS 108 determines whether the requested reduced slotted timer value is less than or equal to a maximum reduced slotted timer value specified by the BS 108 (step 405). If the answer is yes, the BS 108 initializes the reduced slotted timer to the requested slotted timer value (step 408). If the answer is no, the BS initializes the reduced slotted timer to the maximum reduced slotted timer value (step 407). At step 410, the BS 108 begins reduced slotted mode operation using the reduced SCI to page the MS 102 when a page request arrives.

At step 412, the BS 108 monitors whether the reduced slotted timer has expired. If the answer is yes, the BS 108 resumes Normal operation (step 414), and the method ends (step 416). If the answer is no, the method determines whether a different event has occurred to cause the BS 108 to cease reduced slotted mode (step 413), such as acquiring MS 102 on the Traffic Channel. In such a case, the BS 108 clears the reduced slotted timer (step 415), resumes Normal operation (step 414), and the method ends at step 416. If another event has not occurred to cause the BS 108 to cease slotted mode operation, the method continues looping through steps 412 and 413 until the timer expires or another event occurs to end reduced slotted mode operation. The embodiment of FIG. 4 illustrates one order in which the steps may be performed. A person of ordinary skill in the art will recognize that these steps, for example steps 412 and 413 may be performed in a different order or concurrently depending on the particular design or implementation chosen.

In the embodiment of FIG. 4, the BS 108 may not specify a maximum reduced slotted timer value in step 402. In that case, at step 404, the BS 108 determines whether reduced slotted mode has been requested, where the request includes a reduced SCI value and reduced slotted timer value. The method continues at step 408 as previously described above.

Referring now to FIG. 5, a fourth embodiment of the method of the present invention is shown. In this embodiment, the BS 108 responds to MS initiated reduced slotted mode. At step 502, the BS 108 receives a message from the MS 102 requesting reduced slotted mode. The request includes a reduced SCI value and a reduced slotted timer value. At step 504, the BS 108 determines whether the requested reduced slotted timer value is less than or equal to a maximum reduced slotted timer value (as determined by the BS 108). Following the "yes" path, the BS 108 initializes the reduced slotted timer to the requested reduced slotted timer (step 506). At step 508, the BS 108 sends a message to the MS 102 confirming support of reduced slotted mode. At step 510, the BS 108 begins reduced slotted mode operation using the requested reduced SCI to page the MS 102 when a page request arrives.

At step 512, the BS 108 monitors whether the reduced slotted timer has expired. If the answer is yes, the BS 108 resumes Normal operation (step 514), and the method ends (step 516). If the answer is no, the method determines whether a different event has occurred to cause the BS 108 to cease reduced slotted mode (step 513), such as acquiring MS 102 on the Traffic Channel. In such a case, the BS 108 clears the reduced slotted timer (step 515), resumes Normal operation (step 514), and the method ends at step 516. If another event has not occurred to cause the BS 108 to cease slotted mode operation, the method continues looping through steps 512 and 513 until the timer expires or another event occurs to end reduced slotted mode operation. The embodiment of FIG. 5 illustrates one order in which the steps may be performed. A person of ordinary skill in the art will recognize that these steps, for example steps 512 and 513 may be performed in a different order or concurrently depending on the particular design or implementation chosen.

Referring back to step 504 and following the "no" path, when the requested reduced slotted timer value is not less than or equal to the maximum reduced slotted timer value, the BS initializes the reduced slotted timer to the maximum reduced slotted timer value (step 520). At step 522, the BS 108 sends a message to the MS 102 confirming support of reduced slotted mode, wherein the confirmation specifies the maximum reduced slotted timer value. This informs the MS 102 that the requested reduced slotted timer value was rejected by the BS 108 in favor of a lower value. After step 522, the method proceeds to step 510 to continue processing as previously described.

The present invention is advantageous. Following the release of the traffic channel, the MS can operate with a shorter slot cycle for a specified period of time. The primary benefit of the invention is faster call setup for mobile station terminated calls, without requiring registration with the MSC to change the preferred slot cycle index. This is particularly beneficial for packet data calls, where the mobile station may want to operate with a short slot cycle for a period of time of dormancy before reverting back to its normal (i.e. registered) slot cycle.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method of implementing a reduced slotted mode in a mobile station comprising:
   transmitting a request for reduced slotted mode, wherein the request comprises a desired reduced slotted timer value and a desired reduced slot cycle index value;
   determining whether the request is granted; and
   when the request is granted,
      operating in reduced slotted mode until one of a time corresponding to the reduced slotted timer value occurs and a period of time corresponding to the reduced slotted timer value elapses, wherein a frequency at which the mobile station checks for a page is governed by the reduced slot cycle index value.

2. The method of claim 1 wherein the reduced slot cycle index value is a value that causes the mobile station to check for a page continuously.

3. The method of claim 1 further comprising operating in Normal Slotted Mode using a registered slot cycle index after one of the time corresponding to the reduced slotted timer value occurs and the period of time corresponding to the reduced slotted timer value elapses.

4. The method of claim 1 further comprising determining whether an event has occurred to cause the mobile station to cease operating in reduced slotted mode when one of the time corresponding to the reduced slotted timer value has not occurred and the period of time corresponding to the reduced slotted timer value has not elapsed.

5. The method of claim 4 wherein determining whether an event has occurred to cause the mobile station to cease operating in reduced slotted mode comprises determining whether the mobile station has acquired a traffic channel.

6. The method of claim 1 wherein when the request is not granted, the method comprises:
   continuing Normal operation wherein a frequency at which the mobile station checks for a page is governed by a registered slot cycle index value.

7. The method of claim 1 wherein determining whether the request is granted comprises determining whether the mobile station received an indication from the base station that the base station supports reduced slotted mode.

8. The method of claim 1 wherein determining whether the request is granted comprises determining that the request was not rejected by the base station.

9. The method of claim 1 wherein when the request is granted, the method comprises:
   determining whether a base station specified a maximum reduced slotted timer value, wherein the maximum reduced slotted timer value is one of earlier in time than the desired reduced slotted timer value and less than the desired reduced slotted timer value; and
   when the base station specified a maximum value that is one of earlier in time than the desired value and less than the desired value, setting the reduced slotted timer value equal to the maximum reduced slotted timer value specified by the base station.

10. A method of implementing a reduced slotted mode in a mobile station comprising:
   receiving a first message from a base station, the first message indicating whether the base station supports reduced slotted mode;
   when the base station supports reduced slotted mode,
      determining whether the first message specifies a maximum reduced slotted timer value;
      when the first message does not specify a maximum reduced slotted timer value, sending a second message to the base station requesting reduced slotted mode, wherein the second message specifies a reduced slotted timer value and a desired reduced slot cycle index value;
      when the first message specifies a maximum reduced slotted timer value, sending a second message to the base station requesting reduced slotted mode, wherein the second message specifies a reduced slot cycle index and a reduced slotted timer value that is one of earlier in time than the maximum reduced slotted timer value specified in the first message, less than the maximum reduced slotted timer value specified in the first message and equal to the maximum reduced slotted timer value specified in the first message; and
      operating in reduced slotted mode until one of a time corresponding to the reduced slotted timer value occurs and a period of time corresponding to the reduced slotted timer value elapses, wherein a frequency at which the mobile station checks for a page is governed by the reduced slot cycle index value.

11. The method of claim 10 further comprising determining whether an event has occurred to cause the mobile station to cease operating in reduced slotted mode when one of the time corresponding to the reduced slotted timer value has not occurred and the period of time corresponding to the reduced slotted timer value has not elapsed.

12. The method of claim 10 wherein the reduced slot cycle index value is a value that causes the mobile station to check for a page continuously.

13. The method of claim 11 wherein determining whether an event has occurred to cause the mobile station to cease operating in reduced slotted mode comprises determining whether the mobile station has acquired a traffic channel.

14. The method of claim 10 wherein when the base station does not support reduced slotted mode, the method comprises:
   resuming Normal operation wherein a frequency at which the mobile station checks for a page is governed by a registered slot cycle index value.

15. A method of implementing a reduced slotted mode in a base station comprising:
   sending a message to a mobile station, the message indicating whether the base station supports reduced slotted mode;
   receiving a request for reduced slotted mode, the request comprising a desired reduced slot cycle index value and a desired reduced slotted timer value;
   operating in reduced slotted mode until one of a time corresponding to the reduced slotted timer value occurs and a period of time corresponding to the reduced slotted timer value elapses, wherein a slot in which the base station pages the mobile station is governed by the reduced slot cycle index value.

16. The method of claim 15 wherein before operating in reduced slotted mode, the method further comprises:
   determining whether the desired reduced slotted timer value is one of later in time than a maximum reduced slotted timer value and greater than a maximum reduced slotted timer value; and
   when the desired value is one of later in time than the maximum and greater than the maximum, setting a reduced slotted timer value equal to the maximum reduced slotted timer value.

17. The method of claim 16 further comprising communicating the maximum reduced slotted timer value to the mobile station.

18. The method of claim 15 wherein when the base station is operating in reduced slotted mode, the method further comprises determining whether an event has occurred to cause the base station to cease operating in reduced slotted mode.

19. The method of claim 18 wherein determining whether an event has occurred to cause the base station to cease operating in reduced slotted mode comprises determining at least one of whether a time corresponding to the reduced slotted timer value has occurred and whether the period of time corresponding to the reduced slotted timer value has elapsed.

20. The method of claim 18 wherein determining whether an event has occurred to cause the base station to cease operating in reduced slotted mode comprises determining whether the base station acquired the mobile station on a traffic channel.

21. A method of implementing a reduced slotted mode in a base station comprising:
   receiving a request for reduced slotted mode, the request comprising a desired reduced slot cycle index value and a desired reduced slotted timer value;
   determining whether the desired reduced slotted timer value is one of earlier in time than a maximum reduced slotted timer value and less than a maximum reduced slotted timer value;
   when the desired value is one of earlier in time than the maximum and less than the maximum, setting a reduced slotted timer value equal to the desired reduced slotted timer value; and
   operating in reduced slotted mode until one of a time corresponding to a reduced slotted timer value occurs and a period of time corresponding to the reduced slotted timer value elapses, wherein a slot in which the base station pages the mobile station is governed by the reduced slot cycle index value.

22. The method of claim 21 wherein before operating in reduced slotted mode, the method sends a message confirming support of reduced slotted mode.

23. The method of claim 21 wherein when the desired reduced slotted timer value is not one of earlier in time than the maximum and less than the maximum, the method comprises:
   setting the reduced slotted timer value to the maximum reduced slotted timer value; and
   sending a message confirming support of reduced slotted mode, the message comprising the maximum reduced slotted timer value.

24. The method of claim 21 wherein when the base station is operating in reduced slotted mode, the method further comprises determining whether an event has occurred to cause the base station to cease operating in reduced slotted mode.

25. The method of claim 24 wherein determining whether an event has occurred to cause the base station to cease operating in reduced slotted mode comprises determining whether the base station acquired the mobile station on a traffic channel.

26. A storage medium having stored thereon a set of instructions which, when loaded into a processor of a mobile station, causes the mobile station to
   transmit a request for reduced slotted mode, wherein the request comprises a desired reduced slotted timer value and a desired reduced slot cycle index value;
   determine whether the request is granted; and
   when the request is granted,
      operate in reduced slotted mode until one of a time corresponding to the reduced slotted timer value occurs and a period of time corresponding to the reduced slotted timer value elapses, wherein a frequency at which the mobile station checks for a page is governed by the reduced slot cycle index value.

* * * * *